US012730682B2

(12) United States Patent
Wang

(10) Patent No.: US 12,730,682 B2
(45) Date of Patent: Sep. 8, 2026

(54) SERVICE MANAGEMENT METHOD, PLATFORM, SERVICE DELIVERY SYSTEM WITH ARTIFICIAL INTELLIGENCE SERVICES, AND COMPUTER STORAGE MEDIUM

(71) Applicant: BOE Technology Group Co., Ltd., Beijing (CN)

(72) Inventor: Xiaohong Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 416 days.

(21) Appl. No.: 18/282,802

(22) PCT Filed: Jan. 9, 2023

(86) PCT No.: PCT/CN2023/071185
§ 371 (c)(1),
(2) Date: Sep. 19, 2023

(87) PCT Pub. No.: WO2023/142986
PCT Pub. Date: Aug. 3, 2023

(65) Prior Publication Data
US 2024/0168825 A1 May 23, 2024

(30) Foreign Application Priority Data
Jan. 25, 2022 (CN) ......................... 202210090084.7

(51) Int. Cl.
*G06F 9/50* (2006.01)
*G06F 9/445* (2018.01)
(Continued)

(52) U.S. Cl.
CPC ........ *G06F 9/5072* (2013.01); *G06F 9/44521* (2013.01); *G06F 9/466* (2013.01); *G06F 9/485* (2013.01)

(58) Field of Classification Search
CPC .... G06F 9/5072; G06F 9/44521; G06F 9/466; G06F 9/485
See application file for complete search history.

(56) References Cited

U.S. PATENT DOCUMENTS 11,188,354 B1 11/2021 Yu et al.
2022/0327442 A1* 10/2022 Persia ............... G06F 16/24568

FOREIGN PATENT DOCUMENTS

CN 110191007 A 8/2019
CN 111061491 A 4/2020
(Continued)

OTHER PUBLICATIONS

International Search Report for PCT/CN2023/071185 Mailed May 23, 2023.
(Continued)

*Primary Examiner* — Wissam Rashid

(57) ABSTRACT

A service management method, a platform, a service delivery system, and a computer storage medium. The service management method includes: using a service delivery platform to obtain edge node monitoring information, and selecting an available edge node from the obtained monitoring information; creating one or a plurality of transactions, each of the transactions including one or a plurality of artificial intelligence (AI) services; using the service delivery platform to issue the created transaction(s) to the available edge node. The embodiments of the present disclosure realize a cloud-native edge node management method, the transaction issuing mode is efficient and convenient, the transaction management mechanism is efficient and flexible, and the use of AI service orchestration ensures flexible construction, convenience and controllability of transactions.

18 Claims, 8 Drawing Sheets

(51) Int. Cl.
*G06F 9/46* (2006.01)
*G06F 9/48* (2006.01)

(56) References Cited

FOREIGN PATENT DOCUMENTS

| | | | |
|---|---|---|---|
| CN | 112463293 | A | 3/2021 |
| CN | 112799789 | A | 5/2021 |
| CN | 112835714 | A | 5/2021 |
| CN | 113381511 | A | 9/2021 |
| CN | 113630372 | A | 11/2021 |
| CN | 114490063 | A | 5/2022 |
| KR | 1020210060364 | A | 5/2021 |
| WO | 2021211905 | A1 | 10/2021 |

OTHER PUBLICATIONS

Office Action dated Dec. 31, 2024 for CN 2022100900847 and English Translation.

* cited by examiner

Service management platform

Service delivery platform

Edge node

Transaction creation start

AI service selection

AI service orchestration design

Generate an orchestration script

Camera selection

Available edge node selection

Package an AI service module codebase with an orchestration script

Acquire a transaction update/distribution status

Success

End

Edge monitoring

Acquire an available edge node

Transaction update

Update an edge node status

APP transaction update/distribution

Download a transaction package

Load an AI library dynamically

Parse a service orchestration script

Create an AI service call order

Start a transaction thread

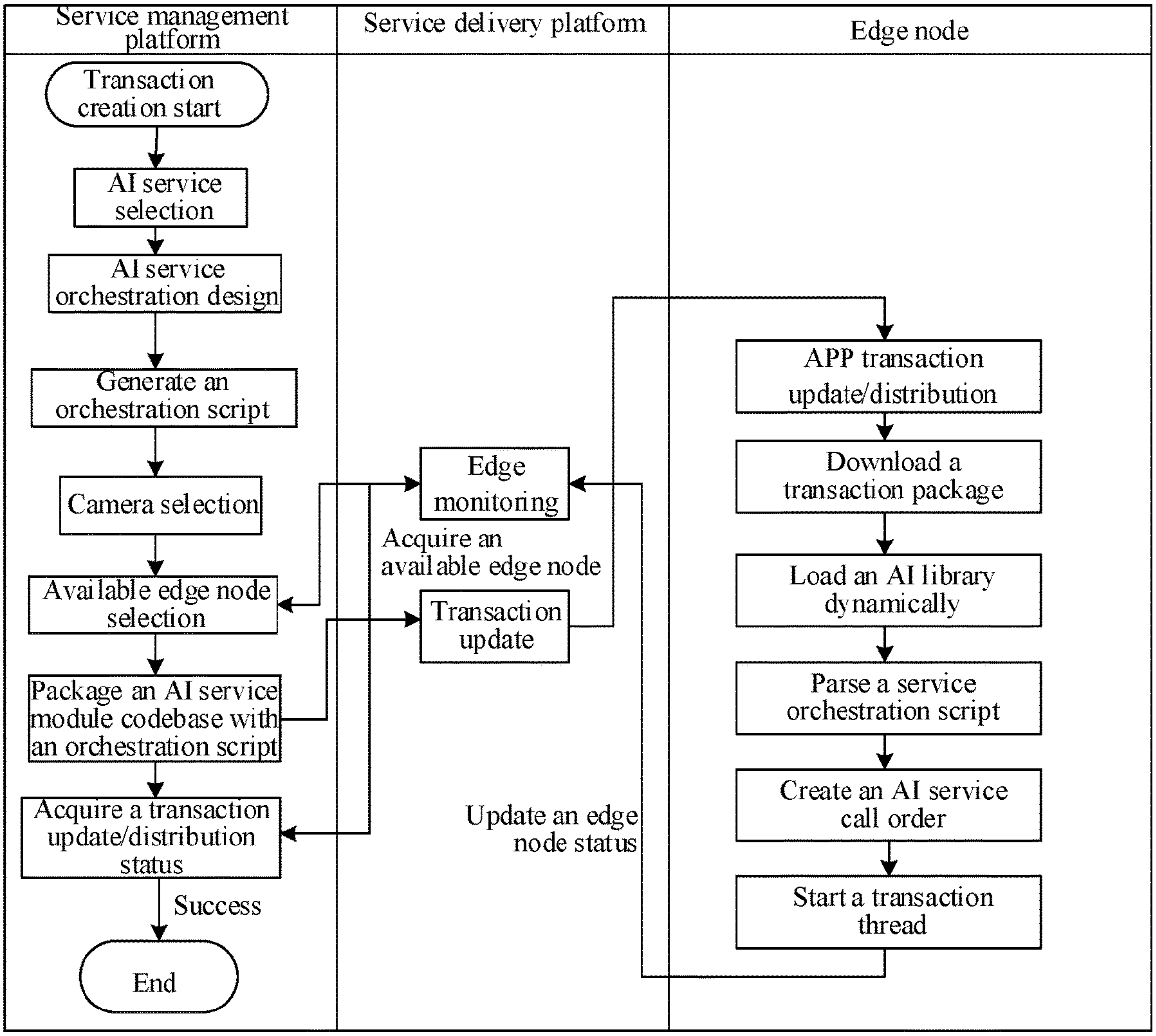

FIG. 3

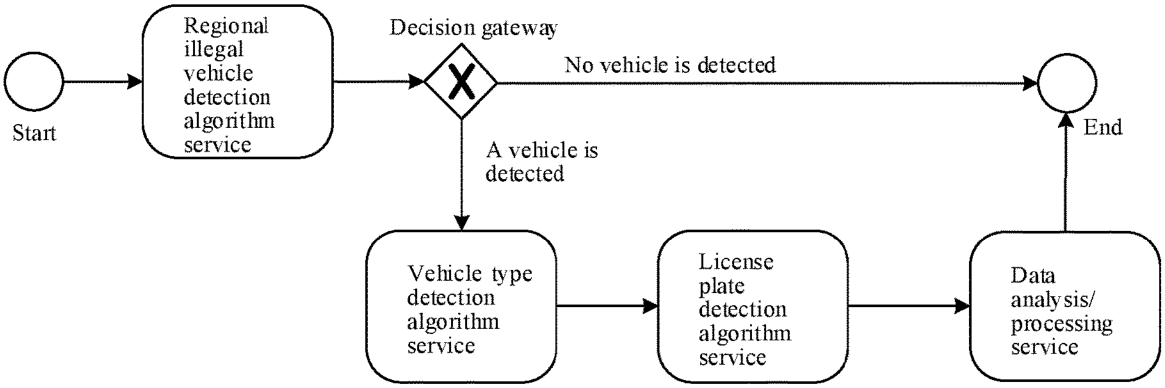

FIG. 4

SERVICE MANAGEMENT METHOD, PLATFORM, SERVICE DELIVERY SYSTEM WITH ARTIFICIAL INTELLIGENCE SERVICES, AND COMPUTER STORAGE MEDIUM

CROSS-REFERENCE TO RELATED APPLICATIONS

The present application is a U.S. National Phase Entry of International Application No. PCT/CN2023/071185 having an international filing date of Jan. 9, 2023, which claims priority of Chinese Patent Application No. 202210090084.7, filed to the CNIPA on Jan. 25, 2022 and entitled "Service Management Method, Platform, Service Delivery System, and Computer Storage Medium". The above-identified applications are hereby incorporated by reference.

TECHNICAL FIELD

Embodiments of the present disclosure relate to, but are not limited to, the technical field of intelligent systems, in particular to a service management method, a platform and a service delivery system.

BACKGROUND

Edge computing refers to an edge device platform, which integrates network, computing, storage and application core capabilities on a side close to a source of objects or data, provides a nearest end service nearby. Its application programs are initiated on an edge side, which produces a faster network service response and meets basic requirements of the industry in real-time service, application intelligence, security and privacy protection, etc. Cloud computing can receive or access historical data of the edge computing in real time.

With development of information technologies, there are increasing Artificial Intelligence (AI) services deployed on edge devices, and a quantity of the edge devices is increasing. Efficient management and delivery of these services have become a key issue.

SUMMARY

The following is a summary of subject matter described herein in detail. The summary is not intended to limit the protection scope of claims.

A service management method is provided in an embodiment of the present disclosure, which includes the following acts: acquiring monitoring information of an edge node by a service delivery platform, and selecting an available edge node from the obtained monitoring information; creating one or more transactions, wherein each created transaction includes one or more artificial intelligence (AI) services; and distributing the created transaction to the available edge node through the service delivery platform.

In an exemplary embodiment, each created transaction further includes at least one of the following: an AI service orchestration script, an image acquisition device corresponding to the transaction, and an available edge node corresponding to the transaction.

In an exemplary embodiment, the method further includes initializing an available edge node.

In an exemplary embodiment, initializing the available edge node includes: selecting an application that is a control management program for defining an operation of the edge node; acquiring a mirror list from the service delivery platform, and selecting a basic container mirror from the mirror list; and according to the selected application and the basic container mirror, constructing an application container mirror by the service delivery platform and storing the application container mirror in a container warehouse, and controlling, by the service delivery platform, the available edge node to download the application container mirror and construct and start the application container.

In an exemplary embodiment, the application includes receiving the distributed transactions, dynamically loading transactions, parsing service orchestration transactions and starting thread to run transactions.

In an exemplary embodiment, creating the one or more transactions includes: selecting one or more AI services; generating an AI service orchestration script according to the selected one or more AI services; selecting one or more image acquisition devices; and using the one or more AI services, an AI service orchestration script, the selected image acquisition devices and information of the available edge node to create a transaction.

In an exemplary embodiment, the method further includes: acquiring a transaction distribution or update status of the available edge node by the service delivery platform.

In an exemplary embodiment, the method further includes: controlling applications on the edge node by the service delivery platform, wherein the controlling includes at least one of the following: creation, start, stop and update.

In an exemplary embodiment, the method further includes: establishing an association between an application and a transaction of the edge node, wherein the application is a control management program for defining an operation of the edge node; and arranging, on a plurality of edge nodes, a unified shared storage configured to store configuration data of the application and transaction of the plurality of edge nodes.

In an exemplary embodiment, when the available edge node fails, the method further includes: detecting whether a first edge node as an idle edge node exists, and migrating the application and transaction of the failed edge node to the first edge node when the first edge node exists; and when there is no first edge node, detecting whether there is a second edge node of which an application version is consistent with an application version of the failed edge node and the second edge node has surplus resources for receiving the transaction of the failed edge node, deleting the association between the application and the transaction of the failed edge node when the second edge node exists, and migrating the transaction of the failed edge node to the second edge node; when there is no the first edge node and the second edge node, generating alarm information.

In an exemplary embodiment, the method further includes: acquiring and displaying an AI service processing result of one or more available edge nodes.

In an exemplary embodiment, the AI service processing result of the one or more available edge nodes are acquired through any one or more of the following service channels: Message Queuing Telemetry Transport, Remote Dictionary Server, distributed publish and subscribe messaging systems and WebSocket.

In an exemplary embodiment, an edge node runs a plurality of transactions in parallel, wherein each of the transactions is initiated as a thread.

In an embodiment of the present disclosure, a service management platform is further provided, which includes a memory; and a processor coupled to the memory, wherein the processor is configured to perform acts of the service management method as described in any of the above embodiments based on instructions stored in the memory.

A service delivery system is further provided in an embodiment of the present disclosure, which includes the service management platform described above and further includes a service delivery platform and one or more edge nodes, wherein the service management platform, the service delivery platform and the edge nodes are interconnected via a network; the service delivery platform is configured to monitor and control one or more edge nodes, and distribute transactions created by the service management platform to one or more edge nodes; and the edge node is configured to receive the transaction distributed by the service delivery platform, process the transaction, and return a processing result to the service management platform.

In an exemplary embodiment, the service delivery system further includes one or more image acquisition devices, the edge nodes are interconnected with the image acquisition devices via a network.

The act of the edge node processing the transaction, includes: according to the received transaction, acquiring an image or video data collected by a corresponding one or more image acquisition devices, and processing the image or the video data.

In an exemplary embodiment, the edge node runs a plurality of transactions in parallel, and the transactions includes customer face registration transactions, customer identification transactions, shop arrival frequency analysis transactions, and stranger reminder transaction; wherein the customer face registration transactions include a face detection service, a face scaling service, a face key point detection service, a face alignment service, a face feature extraction service and a face feature storage service; the customer identification transactions include a video decoding service, an image scaling service, a target detection service, a target tracking service, a face detection service, a face scaling service, a face quality evaluation service, a face alignment service, a face attribute determination service, a face feature extraction service, a face retrieval service and a stranger registration service; the shop arrival frequency analysis transactions include a record uploading service and a record statistics service; and the stranger reminder transactions include a stranger arrival statistics service and a reminder service.

A computer storage medium storing a computer program is further provided in an embodiment of the present disclosure, and when the program is executed by a processor, the service management method according to any one of the above embodiments is implemented.

Other aspects may be comprehended upon reading and understanding of the drawings and detailed description.

BRIEF DESCRIPTION OF DRAWINGS

The accompanying drawings are used for providing further understanding of technical solutions of the present disclosure, constitute a part of the specification, and are used for explaining the technical solutions of the present disclosure together with the embodiments of the present disclosure, but do not constitute limitations on the technical solutions of the present disclosure. Shapes and sizes of various components in the drawings do not reflect actual scales, but are only intended to schematically illustrate contents of the present disclosure.

FIG. 3 is a flow diagram of transaction distribution/update according to an exemplary embodiment of the present disclosure;

FIG. 4 is a schematic diagram of cooperation of a plurality of AI services in an illegal vehicle detection transaction according to an exemplary embodiment of the present disclosure;

DETAILED DESCRIPTION

To make objectives, technical solutions, and advantages of the present disclosure clearer, the embodiments of the present disclosure will be described in detail with reference to the accompanying drawings. It is to be noted that implementations may be practiced in a plurality of different forms. Those of ordinary skills in the art may easily understand such a fact that implementations and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other if there is no conflict.

Unless otherwise defined, technical terms or scientific terms used in the embodiments of the present disclosure should have usual meanings understood by those of ordinary skills in the art to which the present disclosure belongs. "First", "second", and similar terms used in the embodiments of the present disclosure do not represent any order, quantity, or importance, but are only used for distinguishing different components. "Include", "contain", or a similar term means that an element or article appearing before the term covers an element or article and equivalent thereof listed after the term, and other elements or articles are not excluded.

Figure 1:
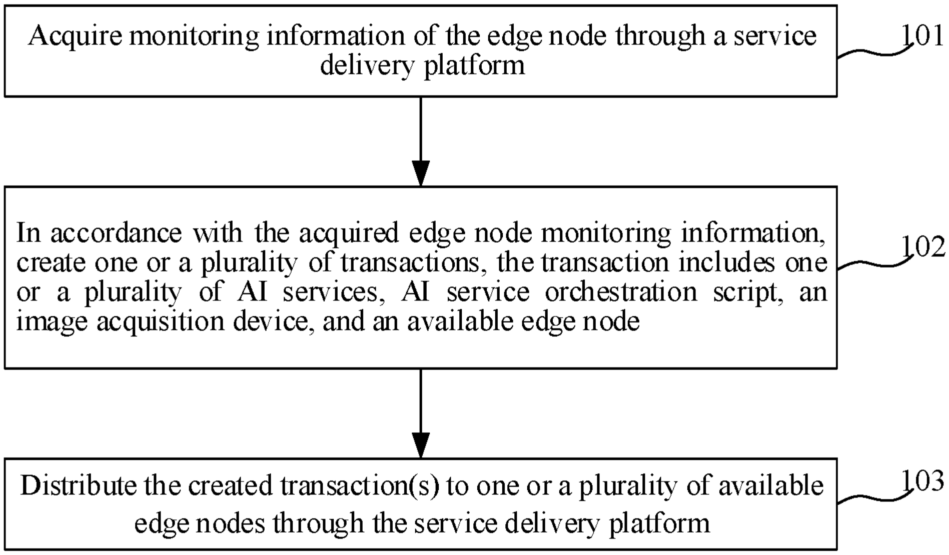
FIG. 1 is a flow diagram of a service management method according to an exemplary embodiment of the present disclosure.

As shown in FIG. 1, a service management method is provided in an embodiment of the present disclosure. The method includes following acts.

In act 101, monitoring information of an edge node is acquired by a service delivery platform, and an available edge node is selected from the acquired monitoring information.

The service management method according to the embodiment of the present disclosure is applied to a service management platform, wherein the service management platform serves as a service initiator, the edge node is a transaction operation unit, and the service delivery platform controls the edge node through a cloud network. In some exemplary implementations, the edge node pre-installs with an edge part to become a K8S node during delivery. A core application (APP) of the edge node can be distributed through a Kubernetes.

The Kubernetes (K8S for short) is a new distributed architecture solution based on a container technology, and is an open source container cluster management system. A Kubernetes cluster typically contains a control node (such as a Master node) and a plurality of Nodes. The Master node is a control node of the K8S cluster. Each K8S cluster needs a Master node to be responsible for management and control of a whole cluster. All of the control commands of K8S are transmitted to the Master node substantially, and the Master node is responsible for an actual execution process. The Nodes are workload nodes in the K8S cluster. Each Node is assigned some workload by the Master Node. When a Node is crashed, workload on the Node is automatically transferred to other Nodes by the Master Node.

In some exemplary implementations, the method further includes initializing an available edge node.

In some exemplary embodiments, initializing the available edge node includes: selecting an application (APP) that is a control management program for defining an operation of the edge node; acquiring an mirror list from the service delivery platform, and selecting a basic container mirror from the mirror list; and constructing an application container mirror by the service delivery platform according to the selected application and the basic container mirror, storing the constructed application container mirror in a container warehouse and controlling, by the service delivery platform, the available edge node to download the application container mirror and construct and start the application container.

Figure 2:
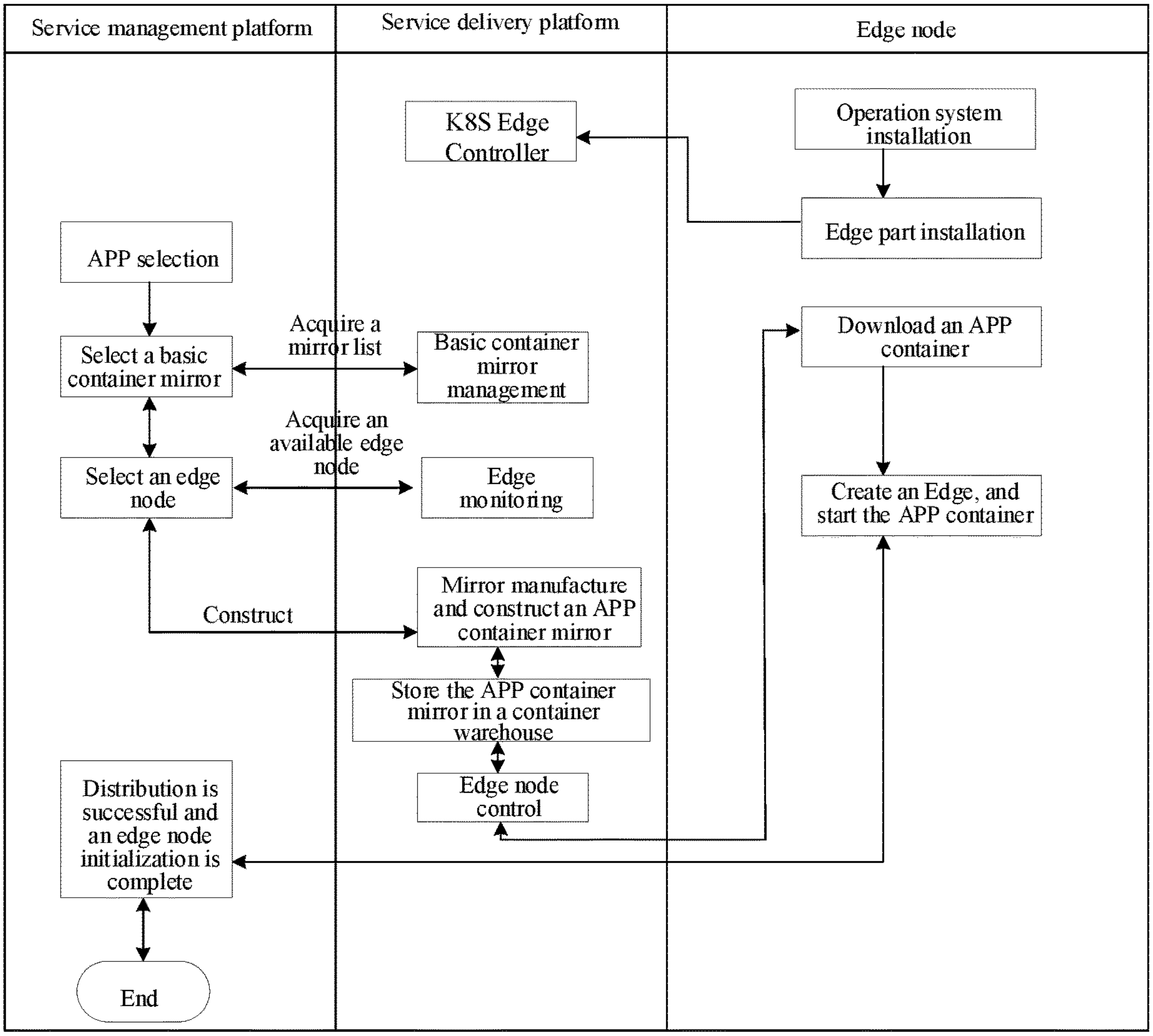
FIG. 2 is a flow diagram of edge node initialization according to an exemplary embodiment of the present disclosure.

As shown in FIG. 2, a service management platform selects a version of an application as needed currently. The service management platform acquires a basic container mirror list from a service delivery platform and selects a basic container mirror from the basic container mirror list. The service management platform acquires monitoring information on edge nodes from the service delivery platform, and selects an available edge node from the obtained monitoring information on the edge nodes. According to the selected application and the basic container mirror, the service management platform constructs an application container mirror through the service delivery platform, stores the application container mirror to a container warehouse, and controls, through the service delivery platform, the available edge node to download the application container mirror to construct and start an application container.

In an embodiment of the present disclosure, the basic container mirror can be a Linux operating system such as Redhat, Ubuntu or the like, and the basic container mirror can provide a basic environment for application running.

In some exemplary implementations, the application may include receiving and distributing transactions, dynamically loading transactions, parsing service orchestration, starting thread and running transactions, and the like.

In some exemplary implementations, the application may further include video decoding transactions, data stack management transactions and the like. When an edge node requires a video decoding service, the application may include a video decoding transaction and a data stack management transaction, wherein the video decoding transaction is responsible for decoding a received video and the data stack management transaction is responsible for storing decoded image data. In other exemplary implementations, the application may not include a video decoding transaction and a data stack management transaction when an edge node receives image data directly over a network.

In the embodiment, after initializing the available edge node, the available edge node starts the application, that is, the available edge node has capabilities of receiving and distributing transactions, dynamically loading transactions, analyzing service orchestration, starting thread and running transactions and the like.

In act 102, one or more transactions are created, wherein each created transaction includes one or more artificial intelligence AI services.

In some exemplary implementations, each created transaction further includes at least one of the following: an AI service orchestration script, an image acquisition device corresponding to the transaction, and an available edge node corresponding to the transaction.

In some exemplary implementations, creating one transaction includes: selecting one or more AI services; generating an AI service orchestration script according to the selected one or more AI services; selecting one or more image acquisition devices; and using a codebase for the one or more AI services, an AI service orchestration script, the selected image acquisition device and information on the available edge node to create one transaction.

As shown in FIG. 3, when a transaction is distributed and started, the service management platform selects one or more AI services and generates an AI service orchestration script according to the selected one or more AI services. The service management platform selects one or more image acquisition devices. The service management platform acquires edge node information from the service delivery platform, and selects an available edge node from the obtained edge node information. The service management platform packages one or more AI service codebases and the AI service orchestration script, and distributes them to the available edge node. The service management platform acquires a transaction distribution or update status of edge nodes through the service delivery platform. When the edge node receives a distributed transaction, the edge node downloads a transaction package, loads an AI library dynamically, parses a service orchestration script, creates an AI service call order, and then starts a transaction thread.

In some exemplary implementations, an edge node runs a plurality of transactions in parallel, wherein each of the transactions serves as a thread when started.

With development of AI technologies, such as speech recognition, image recognition and the like, increasing AI services go into service. However, a single AI algorithm model is often only aimed at a single problem. In some scenarios, a transaction often requires a plurality of cooperated AI services. As shown in FIG. 4, illegal parking monitoring is described as an example, if a vehicle picture is input into a vehicle type recognition model, then a vehicle type can be identified, and the vehicle picture needs to be input into different AI services when the vehicle type needs to be identified. However, in the application scenarios data sources, such as cameras, are often needed, to solve issues such as illegal parking monitoring, etc. A parking situation of vehicles in public places is monitored and whether there is illegal parking in a core area is determined to identify a license plate number, a brand, and a model of illegal vehicles, vehicles are detected by a vehicle type recognition algorithm service in conjunction with a license plate recognition algorithm service, thereby corresponding illegal penalties are implemented.

In some exemplary implementations, an AI service orchestration process can be drawn through a web page or in other visual manners, and a corresponding AI service orchestration script can be generated according to a flow chart to achieve cooperation of a plurality of AI services.

In act 103, the created transaction is distributed to one or more available edge nodes corresponding to the transaction by the service delivery platform.

In some exemplary implementations, the method further includes: acquiring a transaction distribution or update status of the available edge node by the service delivery platform.

As shown in FIG. 3, after receiving the distributed transaction, the edge node downloads a transaction package at first, then dynamically loads an AI library, parses a service orchestration script and creates an AI service call order, then starts a transaction thread, and updates the state of the edge node after the transaction is started successfully.

In some exemplary implementations, the method further includes: controlling applications on the edge node by the service delivery platform, wherein the controlling includes at least one of the following: creation, start, stop and update, etc.

For example, the service delivery platform can be designed and developed based on a K8S KubeEdge, the edge node installs an Edge part to manage and run APP container, and the service delivery platform manages a life cycle of an APP container (creation, start, stop, update, etc.) through the Edge part. In this embodiment, the implementation of the node control depends on the control ability of the K8S to the container, so it is needed to put the edge node on the service delivery platform. If the edge node is put on the service management platform, that is, the service management platform directly controls the edge node, it is needed to customize control (creation, update, start and stop) logic and protocol of the edge node, which will increase a development workload.

In some exemplary implementations, the method further includes: acquiring and displaying an AI service processing result of one or more available edge nodes.

In some exemplary embodiments, the AI service processing result of the one or more available edge nodes are obtained through any one or more of the following service channels: Message Queuing Telemetry Transport (MQTT for short), Remote Dictionary Server (Redis for short), distributed publish and subscribe messaging systems (such as Kafka), WebSocket, a full duplex communication protocol based on Transmission Control Protocol (TCP for short), etc.

According to the service management method provided in the embodiment of the present disclosure, a cloud-native edge node management method is achieved by the service management platform scheduling the service delivery platform for transaction distribution, container mirror construction, edge node monitoring, etc. Therefore, the transaction distribution mode is efficient and convenient, the transaction management mechanism is efficient and flexible, and flexible construction, convenience and controllability of transactions are ensured through AI service orchestration.

A service delivery system is further provided in an embodiment of the present disclosure. The service delivery system includes a service management platform as described above, a service delivery platform and one or more edge nodes. The service management platform, the service delivery platform and the edge node are connected with each other through a network, and the edge node and an image acquisition device are connected with each other through a network.

The service delivery platform is configured to monitor and control one or more edge nodes, and distribute transactions created by the service management platform to one or more edge nodes.

The edge node is configured to receive the transaction distributed by the service delivery platform, process the transaction, and return a processing result to the service management platform.

In some exemplary implementations, the service delivery system further includes one or more image acquisition devices, the edge nodes are interconnected with the image acquisition device via a network.

The edge node processes the transaction in the following ways: according to the received transaction, acquiring an image or video data collected by the one or a plurality of corresponding image acquisition devices, and processing the image or the video data.

Figure 5A:
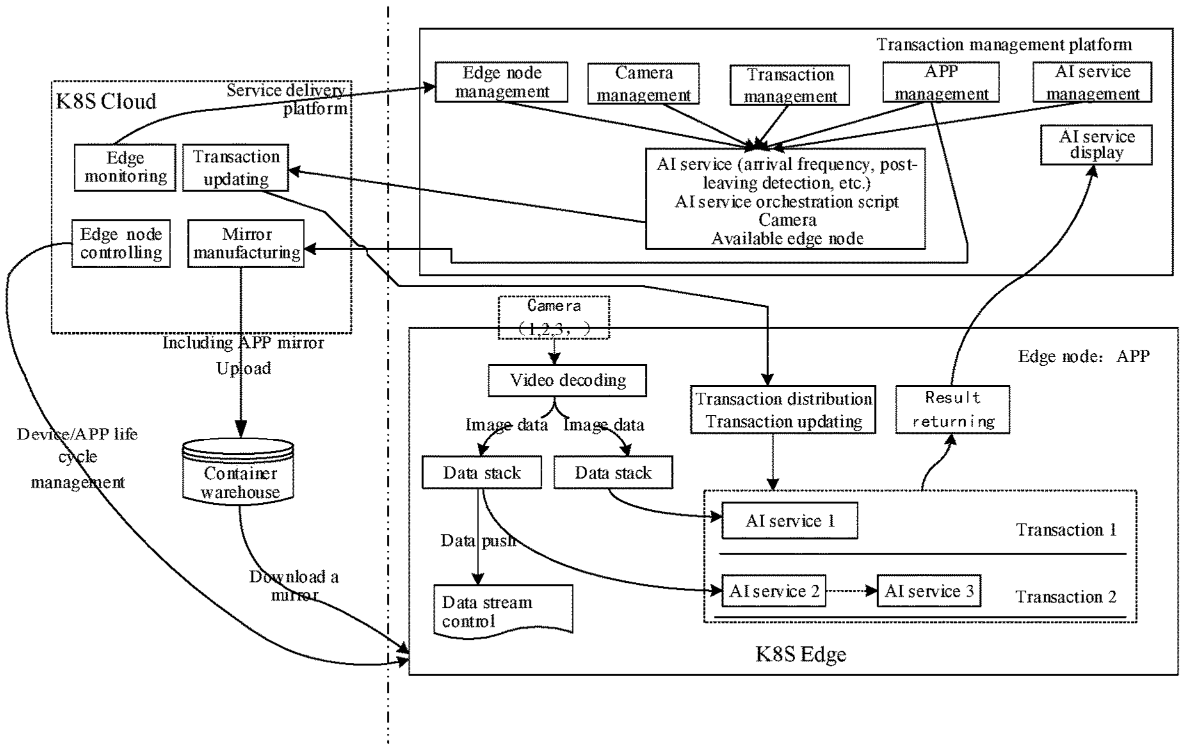
FIGS. 5*a* and 5*b* are schematic diagrams of structures of two service delivery systems according to an exemplary embodiment of the present disclosure.
Figure 5B:
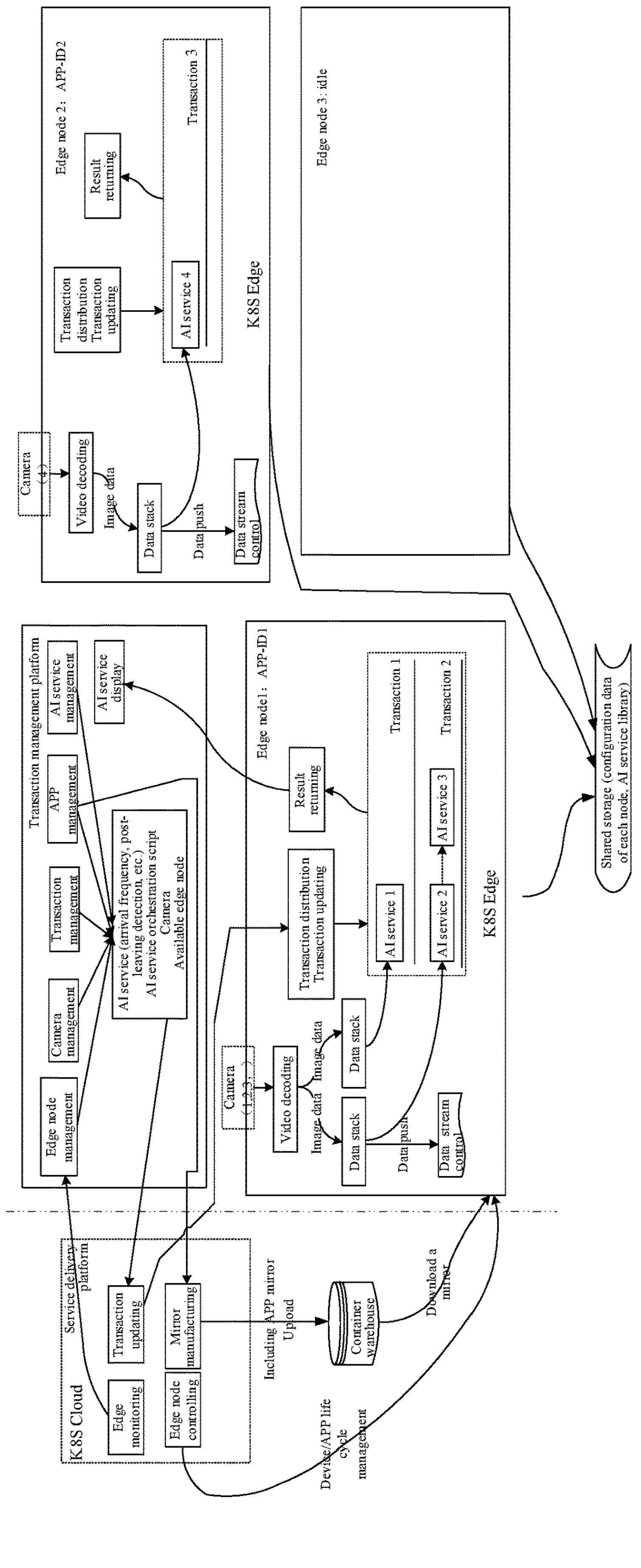

As shown in FIGS. 5*a* and 5*b*, the service delivery system provided in the embodiment of the present disclosure includes, at least, the following components: the service management platform, the service delivery platform and the edge node.

(1) Service Management Platform

The service management platform is a service initiator, and its functional modules include, but are not limited to, an edge node management module, a camera management module, a transaction management module, an APP management module, an AI service management module, an AI service display module, etc.

The edge node management module is responsible for configuring all edge node information of the service management platform, and interacting with an edge monitoring module of a service delivery platform to acquire resource usage information of a current edge node.

The camera management module is responsible for recording configuration information of all camera video streams (for example, the configuration information includes a stream address, a camera model, a camera position, a camera manufacturer and other information), as well as an association relationship between each camera and the transaction (that is, which camera or several cameras are the transaction data source).

The transaction management module defines an AI service capability as a transaction. To create a transaction, an AI service needs to be configured, an AI service orchestration script needs to be generated, a camera needs to be selected, an available edge node needs to be selected, etc. In FIG. 5, a transaction is defined by taking an arriving frequency or a post leaving detection as an example, and the transaction needs to interact with other modules to acquire necessary configuration information.

For the APP management module, an APP refers to a control management program that defines the operation of the edge node. In the embodiment of the present disclosure, main functions of the APP are video stream decoding, AI service management and scheduling, etc. APP management includes starting APP, stopping APP, updating APP, etc.

The AI service management module is responsible for packaging AI services into modules that can be scheduled by the APP, and defining a cooperation arrangement relationship among a plurality of AI services. In an embodiment of the present disclosure, cooperation arrangement between AI services is defined according to an actual usage scenario, which is not limited in the present disclosure.

The AI service display module is responsible for displaying the AI service processing result from the edge node.

(2) Service Delivery Platform

The service delivery platform can be designed and developed based on the K8S KubeEdge. The Edge part is installed on an edge side to manage the edge container running the APP. The service delivery platform manages (creation, start, stop, delete, etc.) the life cycle of the APP container through the Edge part. Through an Open API of the service delivery platform, the service management platform schedules the service delivery platform to perform APP container mirror construction, transaction update and edge node control and to return edge node monitoring information to the service management platform.

The KubeEdge is a native edge computing platform of the Kubernetes. A KubeEdge architecture includes two parts, namely a cloud and an edge side. The cloud is responsible for distributing applications and configurations, while the edge side is responsible for running edge applications and managing access devices.

(3) Edge Node

The edge node is a running unit for a transaction, and the edge node is pre-installed with an Edge part when delivery and becomes a K8S Node. A core application APP of the edge node is distributed through K8S.

The APP application mainly includes video decoding transactions, data stack management transactions, receiving and distributing transactions, dynamic loading transactions, parsing service orchestration transactions, starting thread and running transactions and so on.

An edge node can run a plurality of transactions in parallel, each of the transactions can be started as a thread, and different transactions can be run in parallel.

In some exemplary embodiments, an edge node runs two transactions, namely transaction 1 and transaction 2. For example, the transaction 1 may be used to detect human faces. For example, the transaction 2 can be used to detect human bodies. Since the transaction 1 and the transaction 2 may have different requirements on camera shooting accuracy and shooting range, separate detection is beneficial to separately controlling the shooting accuracy and shooting range of corresponding cameras. However, when returning results, detection results of the transaction 1 and the transaction 2 of a same detection target can be packaged and returned to the service management platform.

The results of the transactions are reported to the service management platform by the edge node through any one or more of the following service channels: a message queue telemetry transport protocol, a remote dictionary service, a distributed publish and subscribe message system, network socket and the like.

In some exemplary embodiments, results output by an Edge AI transaction may include information such as display, alerts, notifications and the like.

Taking a post-leaving detection in this scheme as an example, when the AI service processing result of the edge node shows that there are no relevant personnel in a current post, the edge node sends information such as (a certain position: leaving the post) to the AI service display module of the service management platform, and the AI service display module can pop up an alarm box "someone leaves the post at a certain position" and send an alarm to the relevant management personnel. In addition, a screen processed by an AI service can be acquired by a WebSocket protocol, etc., and off-the-post personnel information and location information can be displayed.

Taking a store arrival frequency detection in this scheme as an example, when a customer appears for a first time on a day, the AI service processing result returns a customer ID, store arrival time and other information to the AI service display module. After receiving the customer's information, the AI service display module records the customer's current store arrival information to a database at first, and then counts arrival times of the customer's to the store in a specified time period (such as 1 year). A prompt message that the arrival times to the store in 1 year>a preset store arrival threshold (such as 5 times) can be popped up on a Web page (Web) side, so that a clerk can focus on the customer. In practice, the preset store arrival threshold can be adjusted as needed. For example, When it is needed to pay attention to unfamiliar customers, information on a customer who arrives to the store for a first time can be popped up, for example, a time of arriving to the store=1, and the preset store arrival threshold can be configured through the AI service display module.

When the service delivery platform monitors a failure (such as crash) of a certain edge node (such as edge node 1), failure information is reported to an edge node management module of the service management platform for processing. In the embodiment of the present disclosure, the edge node can run the application (APP) container and the distributed transaction at a same time, so high availability can be achieved in the following two situations.

1) When there are idle edge nodes (such as edge node 2), because the application is packaged into an application container (docker) mirror, the application can be migrated to other available idle edge nodes (such as edge node 2) through an ability of K8S high availability migration. However, transaction data cannot be migrated directly from the failed edge node 1 to the idle edge node 2. Therefore, in some exemplary embodiments, applications and transactions of each edge node may be associated in a transaction management module of the service management platform, and a unified shared storage for storing application transaction configuration data of a plurality of edge nodes may be mounted on a plurality of edge nodes. Therefore, when an application and transaction data of the edge node 1 are migrated to the edge node 2, it is only needed to read application transaction configuration data of the edge node 1 when the edge node 2 starts the application.

For example, the association between the application and the transaction of the edge node can be represented as APP-ID1 (transaction 1, transaction 2), where ID1 of APP-ID1 can be a name of the docker mirror packaged by the application, and the application and the transaction are associated according to this ID.

When there is no idle edge node, but there is an application version of an edge node is consistent with an application version of the failed edge node, and resource usage of the edge node meets requirements for accepting more transactions, then on the service management platform, the association between the application and the transaction of the failed edge node in the transaction management module is deleted by the edge node management module. For example, the association between the record information of the transaction 1, 2 running on the edge node 1 and the APP-ID1 is deleted, and the association between the APP-ID1 and the transaction 1, 2 is deleted on a corresponding shared storage, so as to avoid a transaction running in a plurality of nodes when the edge node 1 is repaired. The transaction management module sends the corresponding transaction 1, 2 to other available edge nodes with a same version (such as the edge node 2) to run, updates the association between the application and the transaction of the edge node in the shared storage such as configuring APP-ID2 (transaction 4, transaction 1, transaction 2), updates the association between the application and transaction of the edge node in the transaction management module, such as recording APP-ID2 (transaction 4, transaction 1, transaction 2).

2) When there are no idle edge nodes and no edge nodes running the same version of APP and meeting the requirements, the edge node management module triggers an alarm mechanism, and sends short messages, WeChat, emails, etc. to trigger manual intervention.

When a camera fails and an application of the edge node executes video coding and decoding, the edge node finds that a program cannot operate normally, then the edge node sends alarm information. After an edge monitoring module of the service delivery platform receives the alarm information, the edge monitoring module feeds back the received information to the edge node management module of the service management platform, triggers the alarm mechanism, and sends short messages, WeChat, mails, etc. to trigger manual intervention processing. In this embodiment, the edge monitoring module is placed on a service delivery platform because a K8S monitoring system such as Prometheus (an open source system monitoring and alarm system) can be directly used. The service management platform focuses more on service capability management, while the service delivery platform focuses on delivery operation and maintenance management.

When a transaction needs to optimize an AI service, the service management method in the present disclosure can accomplish transaction hot update. Taking updating the transaction 2 as an example, a transaction updating module of the service delivery platform is called through the transaction management module of the service management platform to inform the application APP-ID1 of the edge node 1 to delete the transaction 2. The APP-ID1 stops and exits the transaction 2 thread through the main thread when receiving a deletion command, and removes the edge transaction configuration data APP-ID1 (transaction 1, transaction 2) of the node on a centralized shared storage to become APP-ID1 (transaction 1). The edge node reports to the transaction updating module of the service delivery platform that the current deletion task has been accomplished, and then the transaction management module of service management platform regenerates and distributes a transaction to an edge node that is still the edge node 1 without selection. A transaction distribution and starting process is started, an association of the application and the transaction of the edge node 1 in the transaction management module is updated, and transaction configuration data APP-ID1 (transaction 1, transaction 2) of the edge node 1 in the shared storage are updated.

Next, the service management method in the embodiment of the present disclosure is illustrated by detecting a transaction of an arriving frequency at a store.

Figure 6:
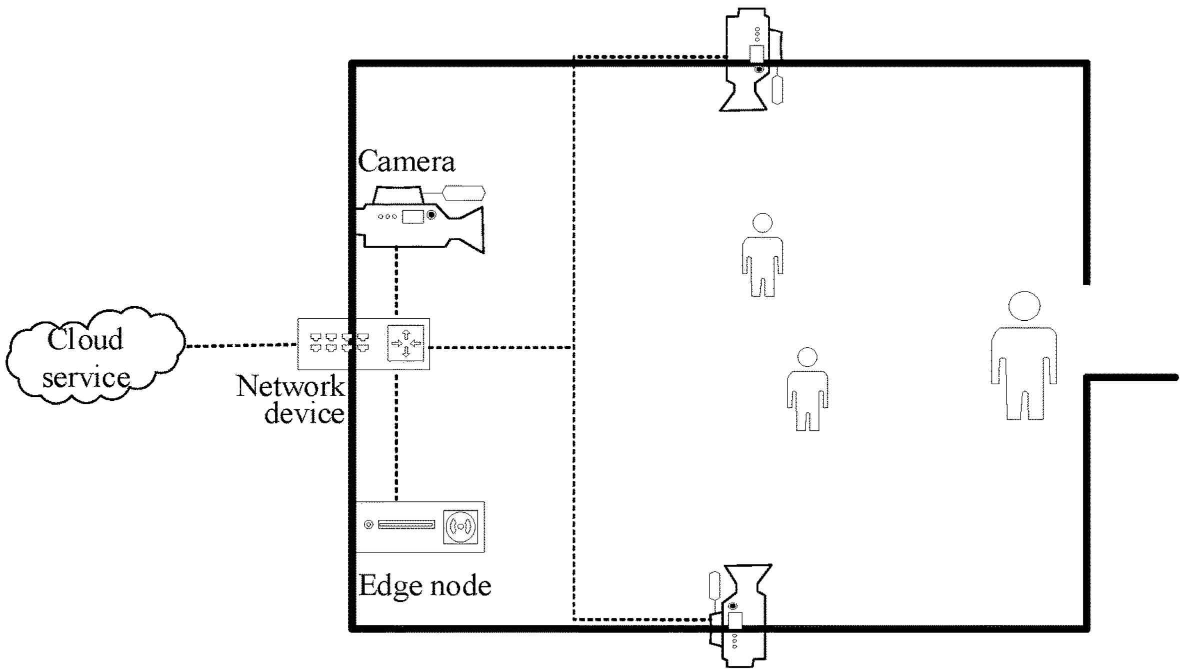
FIG. 6 is a schematic diagram of an application scenario of an arrival frequency detection transaction according to an exemplary embodiment of the present disclosure.

In business, store and other operations, a situation of customers arriving at a store is often needed to obtain, including daily, weekly and monthly statistics, so as to portrait customers and adjust business strategies. In the past, the clerk used to manually record the visits of target customers to acquire data, but this method is inefficient and inaccurate, which is prone to underreporting. In view of this situation, a customer arrival frequency statistics system is designed in an embodiment of the present disclosure, which is based on edge computing, and can provide a safe, efficient and intelligent customer arrival statistics method. The system includes a camera, a network and an edge devices (i.e. an edge node) in hardware, a video stream processing module, a target detection module, a target tracking module, a face correction module, a face recognition module, and functional modules such as data storage, analysis and calculation, display and cloud synchronization in software. A deployment architecture is shown in FIG. 6.

In the embodiment of the present disclosure, by deploying the edge device in or near the store and the edge device is close to an application scenario, low-delay video transmission and high real-time visible customer arrival record or reminder can be achieved.

This system includes two parts: software and hardware.

The system includes the following hardware: an image acquisition device (such as the camera), an image processing device (such as the edge node), a network device that can connect the image acquisition device and the image processing device, a service delivery platform and a service management platform.

The system includes the following software: the software of this system mainly runs on the edge node, including a video decoding module, a target detection module, a target tracking module, a face correction module, a face recognition module and the like. The "module" mentioned in this disclosure can be referred to as "service". Based on a processing result of each module, the information of customer's arrival at the store is stored, and the frequency of arriving at the store every day, every week, every month and every year is analyzed and displayed as needed.

The target detection module is configured to find a target from a scenario (picture), including two processes: detection (where) and recognition (what).

The object tracking module is configured to establish a position relationship of an object to be tracked in a continuous video sequence and obtain a complete motion track of the object. The target tracking module calculates an exact position of the target in a next frame according to a coordinate position of the target in a first frame of a given image. In a moving process, some changes of the target may be shown in the image, such as a change of posture or shape, a change of scale, background occlusion or a change of light brightness, etc. Object tracking technologies are one of the focuses in a research field of computer vision, and have been broadly used. The target tracking technologies are required for tracking and focusing of cameras and automatic target tracking of unmanned aerial vehicles. In addition, there are specific object tracking, such as human body tracking, vehicle tracking in a traffic monitoring system, face tracking and gesture tracking in an intelligent interactive system.

The face correction module is configured to align an angle of a detected face by face key point detection, rotation transformation based on key point and other methods when the detected face is not straight.

The face recognition module includes a face recognition sub-module and a face verification sub-module, wherein the face recognition sub-module is configured to classify a face into a specific identification, and the face verification sub-module is configured to determine whether a pair of pictures belongs to a same person (verification).

In some exemplary implementations, a plurality of transactions may run in parallel on one edge node. For example, the transactions include customer face registration transactions, customer identification transactions, arrival frequency analysis transactions and stranger reminder transactions.

The customer face registration transactions include a face detection service, a face scaling service, a face key point detection service, a face alignment service, a face feature extraction service and a face feature storage service.

The customer identification transactions include a video decoding service, an image scaling service, a target detection service, a target tracking service, a face detection service, a face scaling service, a face quality evaluation service, a face alignment service, a face attribute determination service, a face feature extraction service, a face retrieval service and a stranger registration service.

The arrival frequency analysis transactions include a record uploading service and a record statistics service.

The stranger reminder transactions include a stranger arrival statistics service and a reminder service.

In some exemplary implementations, the system includes, but is not limited to, the following functions.

(1) Customer Face Registration.

Figure 7:
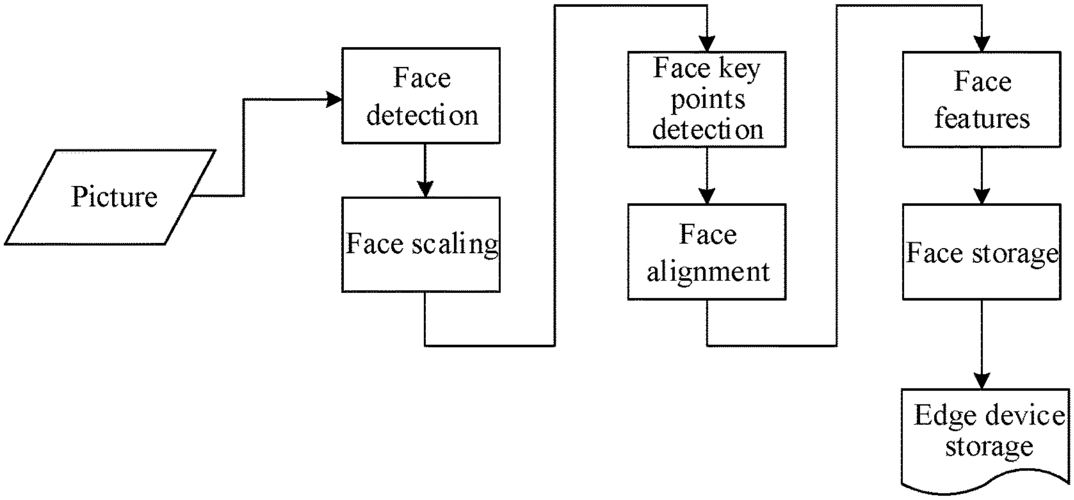
FIG. 7 is a flow chart of customer identification in the arrival frequency detection transaction according to an exemplary embodiment of the present disclosure.

As shown in FIG. 7, in order to identify a customer's identity, the system needs to complete face registration based on the customer's picture at first. A manager can upload the picture through an interface provided by the edge node, such as a Web service. After the picture is uploaded, the customer registration function is triggered, and the picture is transmitted to the target detection module (which includes a face detection algorithm) at first to identify the customer's face information.

In some cases, the face may be crooked, which affects accuracy of customer recognition. At this time, it is needed to align the detected face through the face correction module. An alignment process includes scaling a face size at first, calling a face key point detection algorithm to identify the face key point information, and aligning the face by a face alignment algorithm to achieve crooked face correction. Then the face recognition module is called to extract face features, and finally the face storage module is called to store the extracted features in the edge node. In order to protect privacy of the customers, the customer's image can be deleted after the face features are extracted. According to the embodiment of the present disclosure, by storing user data to the edge device, only the face features of the customer are stored, thus the safety and privacy of customer data are ensured.

(2) Customer Identification and Arrival Frequency Analysis

Figure 8:
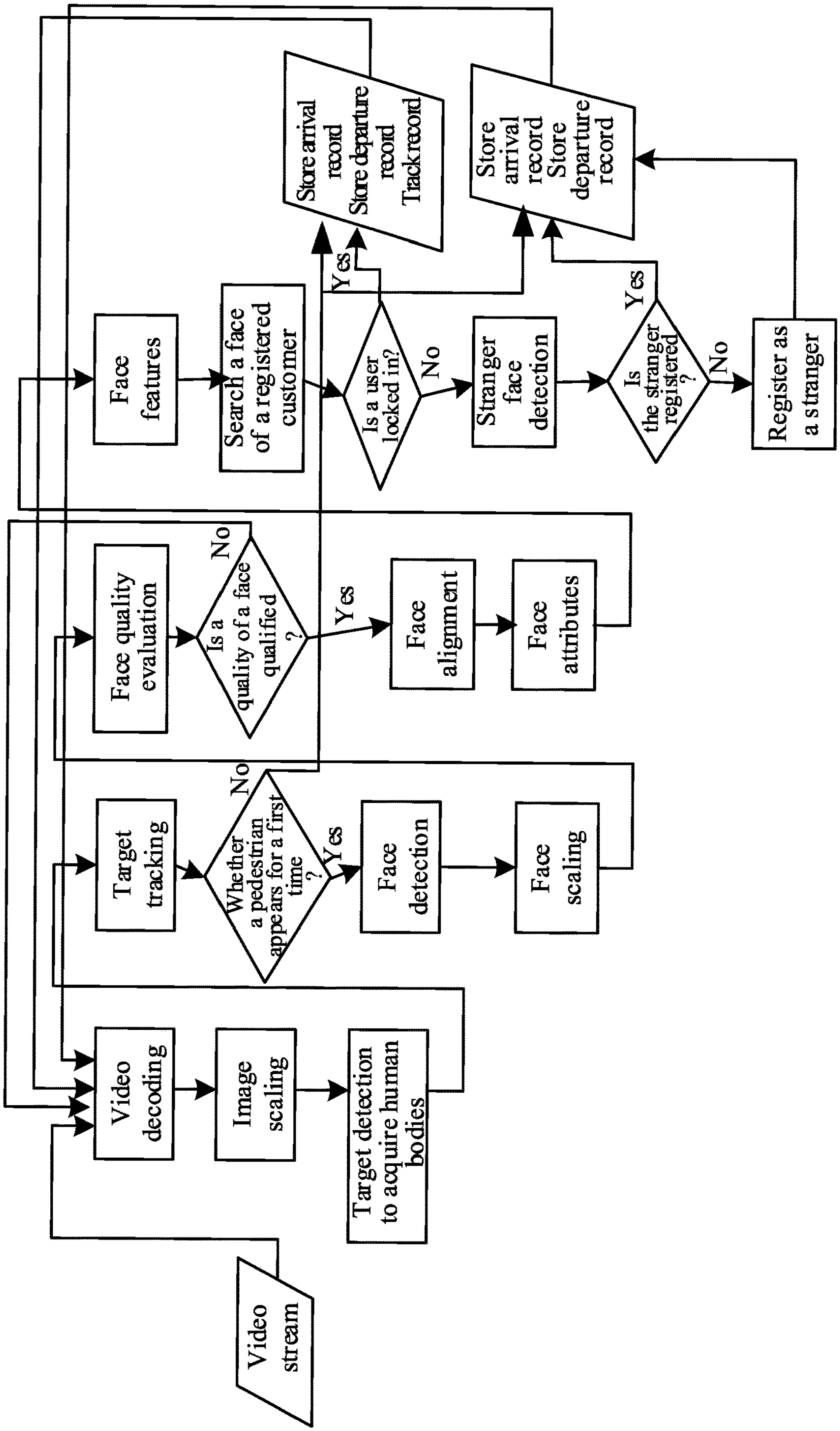
FIG. 8 is a flow chart of customer arrival frequency detection in the arrival frequency detection transaction according to an exemplary embodiment of the present disclosure.

Three cameras are described as an example in an embodiment of the present disclosure to collect images, so as to avoid affecting extraction of user face data by using one camera due to blocking and other reasons. As shown in FIG. 8, an input video stream is decoded by a video decoding module at first, the decoded image is scaled, and a target detection module is called to detect pedestrian information in the image, and a target tracking module determines whether a pedestrian appears for a first time.

When the target tracking module determines that the pedestrian is appearing for the first time, face detection is performed on the pedestrian, image scaling is performed after the face is detected, and the scaled image is input to a face quality evaluation module to determine whether a face of the pedestrian is blurred or blocked. When a quality of the face is unqualified, a next round of video stream processing is performed. When the quality of the face is qualified, face alignment is performed to correct the crooked head and the like, and a corrected result is input into a face attribute module to acquire auxiliary information such as age and gender, and then the face feature extraction module is called to extract the face feature, the extracted feature is used to retrieve a matched customer in a face feature library, and a resulting customer is determined after comprehensive matching the matched customer with the face attribute feature, and the pedestrian is bound with the customer to record the time when the customer arrives at the store and the track information of the customer.

When the target tracking module determines that the pedestrian does not appear for a first time, it determines whether the pedestrian is bound with a customer. When the pedestrian is bound with a customer, a time when the customer arrives at the store and the track information of the customer are recorded. Otherwise, as a stranger, a time when the customer arrives at the store is recorded, and a next round of video stream processing is performed.

When it is found that the tracked pedestrian has disappeared after target detection, a time when the customer leaves the store is recorded. In the embodiment of the present disclosure, real-time information of customers arriving at the store can be captured more accurately and the situation of customers arriving at the store and leaving the store can be recorded more accurately by a plurality of cameras, target tracking, accurate face recognition and other technologies, and the real-time information and situation of customers are provided to operators for reference.

The customer arrival records and in-store track information can be stored on the edge node, which can ensure the security of sensitive data, but problems such as device damage may lead to data loss. Therefore, the customer arrival records and the in-store track information can be uploaded to the cloud in a condition that data security is ensured (such as encrypted transmission).

When the operator needs to analyze a customer behavior, the customer arrival and departure timestamps stored in the database and other storage methods are acquired, the timestamps-based calculation is performed, and the statistics of several times to the store every day, every week and every month are generated. If one store arrival record and one departure record in one day is detected, it is regarded as one store visit. In addition, while recording store arrival record information, in-store track information of the customer is also recorded in the present disclosure, the customer's in-store track can be analyzed as needed and provide some operators with reference for customer portraits.

(3) Statistical Reminders of Strangers Arriving at the Store

As shown in FIG. 8, complete customer arrival frequency statistics and activity track analysis can be achieved for registered customers. In many cases, some customers are not registered but visit stores frequently, so it is needed to remind the clerk to pay attention to guiding the customers to register and improve customer stickiness.

According to the present disclosure, a stranger face database is designed for strangers. When a target pedestrian is retrieved to be a non-registered customer, a stranger face database is further retrieved. When the target pedestrian is a non-registered stranger, the target pedestrian is registered at first, then the arrival time and departure time are recorded. When the record is completed, the statistics of the stranger arriving at the store are triggered. When the times of arrivals of the target pedestrian is greater than a preset arrival threshold, a position and a head portrait of the pedestrian are sent to the clerk to remind and guide the pedestrian to register.

In the embodiment of the present disclosure, by introducing the stranger face library, reminding of strangers coming to the store for many times is achieved, so as to guide the clerk to pay attention to potential customers, and improve the operation effect.

(4) Display of Analysis Results

In the embodiment of the present disclosure, a Web application can be deployed on the edge node, and a front end (such as the customer-to-store business system deployed at an edge end) can be communicated with the Web application through the edge application service to acquire a user-to-store record. The front end can view the user records or store arrival records of an assigned category user through a browser.

In the embodiment of the present disclosure, the Web application can alternatively be deployed in the cloud, and the store arrival record can be obtained by communicating between the customer arrival business system deployed at the edge side and a cloud application service, and the cloud Web page is responsible for displaying.

In an embodiment of the present disclosure, a service management platform is further provided, which includes a memory; and a processor coupled to the memory, wherein the processor is configured to perform acts of the service management method as described in the previous embodiments based on instructions stored in the memory.

Figure 9:
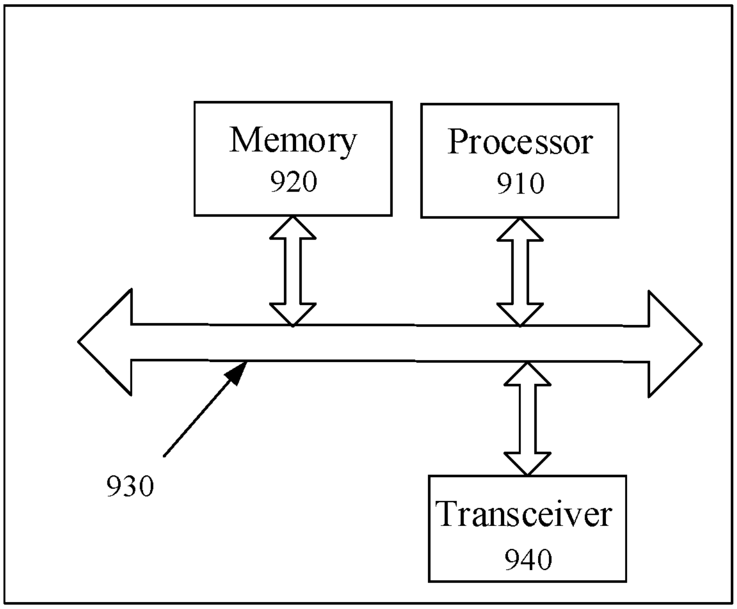
FIG. 9 is a schematic diagram of a structure of a service management platform according to an exemplary embodiment of the present disclosure.

As shown in FIG. 9, in an example, a service management platform may include: a processor 910, a memory 920, a bus system 930, and a transceiver 940, wherein the processor 910, the memory 920, and the transceiver 940 are connected via the bus system 930, the memory 920 is configured to store instructions, and the processor 910 is configured to execute the instructions stored in the memory 920 to control the transceiver 940 to send signals. Alternatively, the transceiver 940 may acquire monitoring information on an edge node through the service delivery platform under a control of the processor 910, the processor 910 creates one or more transactions including one or more AI services, AI service orchestration scripts, image acquisition devices, and available edge nodes based on the acquired monitoring information on the edge node. The transceiver 940 distributes the created transactions to the one or more available edge nodes through the service delivery platform under the control of the processor 910.

It should be understood that the processor 910 may be a Central Processing Unit (CPU), or the processor 910 may be other general-purpose processors, a digital signal processor (DSP), an application specific integrated circuit (ASIC), a field programmable gate array (FPGA), or other programmable logic device, a discrete gate or a transistor logic device, a discrete hardware component, etc. A general-purpose processor may be a microprocessor, or the processor may be any conventional processor, etc. The memory 920 may include a read only memory and a random access memory, and provide instructions and data to the processor 910. A portion of the memory 920 may include a non-volatile random access memory. For example, the memory 920 may store information of a device type.

The bus system 930 may include a power bus, a control bus, a status signal bus, or the like in addition to a data bus. However, for clarity of illustration, various buses are all denoted as the bus system 930 in FIG. 9.

In an implementation process, processing performed by a processing device may be completed through an integrated logic circuit of hardware in the processor 910 or instructions in a form of software. That is, the steps of the method in the embodiments of the present disclosure may be embodied as executed and completed by a hardware processor, or executed and completed by a combination of hardware in the processor and a software module. The software module may be located in a storage medium such as a random access memory, a flash memory, a read only memory, a programmable read-only memory, an electrically erasable programmable memory, or a register, etc. The storage medium is located in the memory 920. The processor 910 reads information in the memory 920, and completes the acts of the above method in combination with its hardware. In order to avoid repetition, detailed description is not provided herein.

A computer storage medium is further provided in an embodiment of the present disclosure, wherein the computer storage medium is stored with executable instructions, and when the executable instructions are executed by a processor, the service management method provided in any embodiment of the present disclosure can be achieved. According to the service management method, monitoring information of an edge node can be acquired by a service delivery platform, one or more transactions are created according to the acquired monitoring information of the edge node, wherein each created transaction includes one or more AI services, AI service orchestration scripts, image acquisition devices and available edge nodes; and the created transactions are distributed to the one or more available edge nodes through the service delivery platform. Therefore, a cloud-native edge node management method is achieved, in which a transaction distribution mode is efficient and convenient, and a transaction management mechanism is efficient and flexible. Through AI service orchestration, flexible construction, convenience and controllability of transactions are ensured. A method for the service management platform to perform service management, driven by executing the executable instructions, is basically the same as the service management method provided in the above embodiments of the present disclosure, which is not be repeated in detail here.

According to the service management method, the platform, the service delivery system and the computer storage medium provided in the embodiments of the present disclosure, a cloud-native edge node management method is achieved by the service management platform scheduling the service delivery platform for transaction distribution, container mirror construction, edge node monitoring, etc. Therefore, a transaction distribution mode is efficient and convenient, a transaction management mechanism is efficient and flexible, and flexible construction, convenience and controllability of transactions are ensured through AI service orchestration.

Those of ordinary skills in the art may understand that all or some of acts in the methods disclosed above, functional modules or units in systems and apparatuses may be implemented as software, firmware, hardware, and an appropriate combination thereof. In a hardware implementation mode, division between functional modules/units mentioned in the above description does not necessarily correspond to division of physical components. For example, a physical component may have multiple functions, or a function or an act may be performed by several physical components in cooperation. Some components or all components may be implemented as software executed by a processor such as a digital signal processor or a microprocessor, or implemented as hardware, or implemented as an integrated circuit such as a specific integrated circuit. Such software may be distributed on a computer-readable medium, and the computer-readable medium may include a computer storage medium (or a non-transitory medium) and a communication medium (or a transitory medium). As known to those of ordinary skills in the art, a term computer storage medium includes volatile and nonvolatile, and removable and irremovable media implemented in any method or technology for storing information (for example, a computer-readable instruction, a data structure, a program module, or other data). The computer storage medium includes, but is not limited to, a RAM, a ROM, an EEPROM, a flash memory or other memory technologies, a CD-ROM, a Digital Versatile Disk (DVD) or other optical disk storages, a magnetic cartridge, a magnetic tape, magnetic disk storage or other magnetic storage apparatuses, or any other medium that may be used for storing desired information and may be accessed by a computer. In addition, it is known to those of ordinary skills in the art that the communication medium usually includes a computer-readable instruction, a data structure, a program module, or other data in a modulated data signal, such as, a carrier or another transmission mechanism, and may include any information delivery medium.

Although the implementations disclosed in the present disclosure are as above, the described contents are only implementations used for convenience of understanding the present disclosure and are not intended to limit the present disclosure. Those skilled in the art may make any modification and change in the forms and details of the implementations without departing from the spirit and scope of the present disclosure. However, the scope of protection of the present disclosure should still be subject to the scope defined by the attached claims.

The invention claimed is:

1. A service management method, comprising:

acquiring monitoring information of an edge node by a service delivery platform, and selecting an available edge node from the obtained monitoring information;

creating one or more transactions, wherein each created transaction comprises one or more artificial intelligence (AI) services;

distributing the created transactions to the available edge node through the service delivery platform; and initializing the available edge node, wherein the initializing the available edge node comprises:

selecting an application that is a control management program for defining an operation of the edge node;

acquiring a mirror list from the service delivery platform, and selecting a basic container mirror from the mirror list; and according to the selected application and the basic container mirror, constructing an application container mirror by the service delivery platform and storing the application container mirror in a container warehouse, and controlling, by the service delivery platform, the available edge node to download the application container mirror, and construct and start the application container.

2. The service management method of claim 1, wherein each created transaction further comprises at least one of: an AI service orchestration script, an image acquisition device corresponding to the transaction, or the available edge node corresponding to the transaction.

3. The service management method of claim 1, wherein the application comprises receiving the distributed transactions, dynamically loading transactions, parsing service orchestration transactions and starting thread to run transactions.

4. The service management method of claim 1, wherein creating the transaction comprises:

selecting one or more AI services;

generating an AI service orchestration script according to the selected one or more AI services;

selecting one or more image acquisition devices; and creating the transaction using the one or more AI services, an AI service orchestration script, the selected image acquisition devices and information of the available edge node.

5. The service management method of claim 1, further comprising:

acquiring a transaction distribution or update status of the available edge node by the service delivery platform.

6. The service management method of claim 1, further comprising:

controlling applications on the edge node by the service delivery platform, wherein the controlling comprises at least one of: creation, start, stop or update.

7. The service management method of claim 1, further comprising:

establishing an association between the application and the transaction of the edge node, wherein the application is a control management program for defining an operation of the edge node; and arranging, on a plurality of the edge nodes, a unified shared storage configured to store configuration data of the application and transaction of the plurality of the edge nodes.

8. The service management method of claim 7, wherein based on a determination that the available edge node fails, the method further comprises:

detecting whether a first edge node as an idle edge node exists, and migrating the application and transaction of the failed edge node to the first edge node when the first edge node exists.

9. The service management method of claim 1, further comprising:

acquiring and displaying an AI service processing result of one or more available edge nodes.

10. The service management method of claim 9, wherein acquiring the AI service processing result of one or more available edge nodes is through any one or more of the following service channels: Message Queuing Telemetry Transport, Remote Dictionary Server, distributed publish and subscribe messaging systems or WebSocket.

11. The service management method of claim 1, wherein one of the edge nodes is configured to run a plurality of transactions in parallel, and each of the transactions is initiated as a thread.

12. A service management platform, comprising a memory and a processor coupled to the memory, wherein the processor is configured to perform acts of the service management method of claim 1 based on instructions stored in the memory.

13. A service delivery system, comprising the service management platform of claim 12 and further comprising a service delivery platform and one or more edge nodes, wherein:

the service management platform, the service delivery platform and the edge nodes are interconnected via a network;

the service delivery platform is configured to monitor and control one or more edge nodes, and distribute transactions created by the service management platform to one or more edge nodes; and the edge node is configured to receive the transactions distributed by the service delivery platform, process the transactions, and return a processing result to the service management platform.

14. The service delivery system of claim 13, further comprising one or more image acquisition devices, wherein:

the edge nodes and the image acquisition devices are interconnected via the network; and the edge node processing the transactions, comprises: according to a received transaction, acquiring an image or video data collected by a corresponding one or more image acquisition devices, and processing the image or the video data.

15. The service delivery system of claim 13, wherein:

the edge node is configured to run a plurality of transactions in parallel, and the transactions comprises customer face registration transactions, customer identification transactions, shop arrival frequency analysis transactions, and stranger reminder transactions;

the customer face registration transactions comprise a face detection service, a face scaling service, a face key point detection service, a face alignment service, a face feature extraction service and a face feature storage service;

the customer identification transactions comprise a video decoding service, an image scaling service, a target detection service, a target tracking service, a face detection service, a face scaling service, a face quality evaluation service, a face alignment service, a face attribute determination service, a face feature extraction service, a face retrieval service and a stranger registration service;

the shop arrival frequency analysis transactions comprise a record uploading service and a record statistics service; and the stranger reminder transactions comprise a stranger arrival statistics service and a reminder service.

16. A non-transitory computer readable storage medium, stored thereon a computer program, wherein when the computer program is executed by a processor, the service management method of claim 1 is implemented.

17. The service management method of claim 8, wherein based on a determination that the available edge node fails, the method further comprises:

based on a determination that there is no first edge node, detecting whether there is a second edge node, an application version of the second edge node is consistent with an application version of the failed edge node and the second edge node has surplus resources for receiving the transaction of the failed edge node, deleting the association between the application and the transaction of the failed edge node when the second edge node exists, and migrating the transaction of the failed edge node to the second edge node.

18. The service management method of claim 17, wherein based on a determination that the available edge node fails, the method further comprises:

based on a determination that there is no the first edge node and the second edge node, generating alarm information.

* * * * *